Patented June 21, 1932

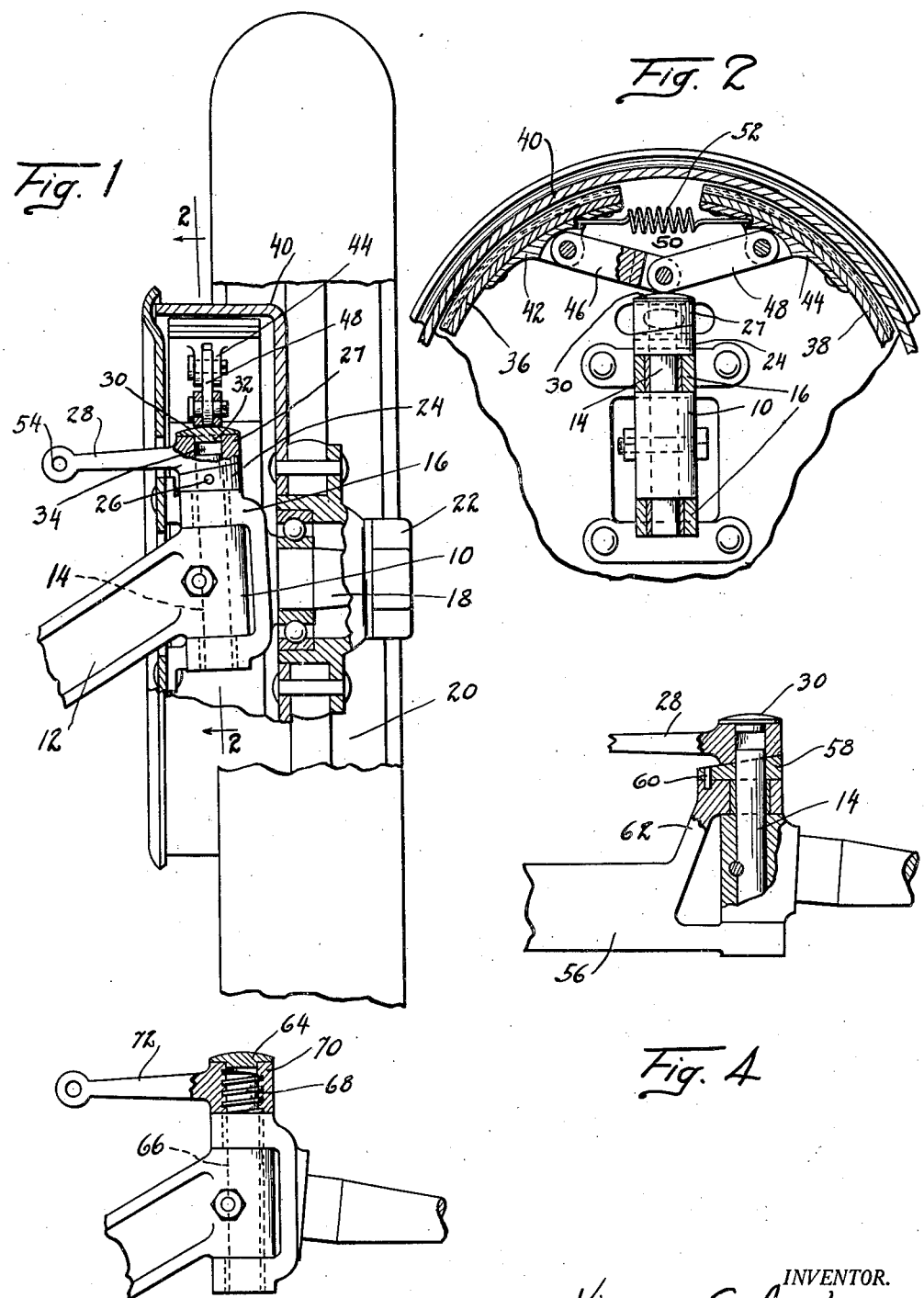

1,863,644

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

FRONT WHEEL BRAKE ACTUATING MECHANISM

Application filed June 12, 1930. Serial No. 460,724.

My invention relates to brake mechanism for use on automotive vehicles and has particular reference to an actuating mechanism peculiarly adapted to cooperate with the steerable or swivelled front wheel structure of such vehicles.

An object of my invention is to transmit the manual effort utilized in applying vehicle brakes to the expansible shoes of a front wheel brake assembly in an extremely direct and positive way, at the same time utilizing fewer parts than has hitherto been customary.

Still a further object of my invention is to expand the front wheel brake shoes by means of a direct linear thrust acting upon a toggle connecting adjacent ends of such shoes and to produce such thrust by simple rotation of a camming member rotatable in a plane perpendicular to that of the brake shoes.

Still another meritorious feature of my invention resides in the fact that very little adjustment or replacement of parts will become necessary by virtue of the simplicity of my structure. Furthermore, my actuating mechanism will be unaffected by the relative position of the axle and wheels as the latter rotate through their turning arc.

Still a further object of my invention is to so arranged my camming members and thrust member that no additional force will be required to apply a constant maximum braking force to the expanding brake shoes when the front wheels are out of alignment.

Still other meritorious features of my invention will be apparent from the following description taken in conjunction with the drawing wherein:

Fig. 1 is a rear elevation, partly in section, of my improved structure,

Fig. 2 is a section of the coupling between the expansible friction shoes and the camming mechanism, Fig. 3 illustrates a somewhat modified form of camming mechanism, and Fig. 4 illustrates a modified structure wherein a different type of axle is utilized.

Secured against rotation within the end bearing 10 of front axle 12 is a king pin 14. The steering knuckle 16 is rotatably journalled upon the king pin 14 as illustrated, carrying as an integral portion thereof the spindle 18 upon which the wheel 20 is rotatably journalled and secured in position by means of the hub cap 22.

A cam plate 24 is mounted on the king pin 14 and secured against rotation thereabout by means of the pin 26. The hub 27 of lever 28 is rotatably mounted upon the kind pin 14 and its lower bearing surface is shaped to cooperate with the camming surface of cam plate 24. A hardened steel thrust plate 30 is supported upon the hub 27 in any desired manner. In my preferred form I have illustrated this thrust member 30 as being provided with a shank portion 32 which fits in the annular opening 34 of the hub, the king pin 14 extending up into this opening from below.

Radially expansible brake shoes 36 and 38 are mounted within the brake drum 40 and are adapted to expand radially outward against said drum to retard the vehicle. Adjacent ends of each of the shoes are provided with flanges 42 and 44 respectively and to these flanges are pivoted the outer extremities of the arms 46 and 48 which comprise a toggle connection broadly indicated by the numeral 50.

The pivoted center of this toggle 50 is adapted to rest upon the thrust plate 30 and a spring 52 functions to retain the brake shoes in their inoperative position, thus tending to force the thrust plate 30 and its cooperating camming elements into their inoperative position.

Upon rotation of lever 28, which may be connected up through the eye 54 with conventional linkage operated from the brake pedal, the said lever will cooperate with camming member 24 to exert an upward pressure upon the thrust plate 30 and this in turn will expand the toggle 50 to spread the brake shoes apart and so apply the brakes. If the spring 52 should prove insufficient to return the mechanism to its inoperative position it is obvious that other yielding means might be attached to arm 28 to assist in performing that function.

Structure similar to that described above may be adapted for use with the type of front axle indicated by numeral 56 in Fig. 4. The camming plate 58 is secured against rotation by means of a pin 60 which drops into a corresponding opening in the bifurcated arm 62 of the axle. The remaining structure is precisely the same as hitherto described.

In Fig. 3 I have illustrated a somewhat modified structure to obtain the direct positive thrust of plate 64. Here the upper extremity of king pin 66 is externally threaded as at 68. The hub 70 of lever 72 is internally threaded to cooperate with the threaded upper portion of the king pin and thrust plate 64 is forced upwardly as lever 72 is rotated.

Having illustrated preferred embodiments of my improved structure, various modifications will be apparent to those skilled in the art and for that reason I intend to limit myself only within the scope of the appended claim.

I claim:

Brake mechanism comprising a spindle rotatably journalled about a fixed king pin, a wheel and brake drum rotatably journalled on said spindle, a pair of expansible friction members non-rotatably supported within the drum, a sleeve secured over said pin above the spindle journal and seated thereon, the upper edge of said sleeve constituting a camming surface, a second sleeve slidable along said pin above the first sleeve and having a lower edge adapted to cooperate with said camming surface to force the second sleeve axially along the pin on rotation thereof, a thrust plate seated by gravity upon the upper edge of said axially movable sleeve and having a central portion depending therein to position said plate, and a toggle connection between adjacent ends of said friction members, the intermediate portion of said toggle being adapted to bear on said thrust plate.

In testimony whereof, I, VINCENT G. APPLE, sign this specification.

VINCENT G. APPLE.